US010506154B2

United States Patent
Mu

(10) Patent No.: US 10,506,154 B2
(45) Date of Patent: Dec. 10, 2019

(54) METHOD AND DEVICE FOR GENERATING A PANORAMIC IMAGE

(71) Applicant: Shanghai Xiaoyi Technology Co., Ltd., Shanghai (CN)

(72) Inventor: Junzhou Mu, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 10 days.

(21) Appl. No.: 15/873,041

(22) Filed: Jan. 17, 2018

(65) Prior Publication Data
US 2019/0014260 A1 Jan. 10, 2019

(30) Foreign Application Priority Data

Jul. 4, 2017 (CN) .......................... 2017 1 0538676

(51) Int. Cl.
G06T 3/40 (2006.01)
H04N 5/232 (2006.01)
G06T 3/00 (2006.01)

(52) U.S. Cl.
CPC ....... *H04N 5/23238* (2013.01); *G06T 3/0018* (2013.01); *G06T 3/0068* (2013.01); *G06T 3/0093* (2013.01); *G06T 3/4038* (2013.01); *G06T 2207/20221* (2013.01)

(58) Field of Classification Search
CPC . H04N 5/23238; G06T 3/0068; G06T 3/0018; G06T 3/0093; G06T 3/4038; G06T 2207/20221

USPC .......................................................... 348/36
See application file for complete search history.

(56) References Cited

U.S. PATENT DOCUMENTS

| 5,978,017 A | * | 11/1999 | Tino | ......................... B60Q 1/52 348/148 |
| 6,831,680 B1 | * | 12/2004 | Kumler | .............. B64D 45/0015 348/148 |
| 2004/0001138 A1 | * | 1/2004 | Weerashinghe | ....... G03B 35/08 348/36 |

(Continued)

OTHER PUBLICATIONS

Audu et al, Generation of three-dimensional content from stereo-panoramic view (Year: 2013).*

(Continued)

*Primary Examiner* — Shan E Elahi
(74) *Attorney, Agent, or Firm* — Cantor Colburn LLP

(57) ABSTRACT

A method and a device for generating a panoramic image are disclosed. According to some embodiments, a device for generating a panoramic image includes an imaging device configured to capture first and second fisheye images in a first coordinate system; a memory, configured to store the first and second fisheye images, and instructions; and a processor, configured to execute the instructions to perform: a coordinate system rotation process on the first coordinate system to obtain a second coordinate system; an equirectangular projection process on the first and second fisheye images to obtain first and second equirectangular images in the second coordinate system, respectively; a blending process on the first and second equirectangular images to form a blended image; an orientation correction process on the blended image to obtain the panoramic image.

20 Claims, 9 Drawing Sheets

(56) References Cited

U.S. PATENT DOCUMENTS

| | | | |
|---|---|---|---|
| 2010/0097444 A1* | 4/2010 | Lablans | G03B 35/00 348/46 |
| 2013/0044108 A1* | 2/2013 | Tanaka | G06T 15/04 345/419 |
| 2013/0100132 A1* | 4/2013 | Katayama | H04N 13/275 345/420 |
| 2014/0192144 A1* | 7/2014 | St. Clair | H04N 5/23238 348/36 |
| 2016/0071238 A1* | 3/2016 | Kimura | H04N 5/23238 348/36 |
| 2016/0080647 A1* | 3/2016 | Kimura | H04N 1/3876 348/36 |
| 2016/0080725 A1* | 3/2016 | Barnes | H04N 5/23293 348/36 |
| 2016/0198088 A1* | 7/2016 | Wang | H04N 5/23238 348/36 |
| 2016/0292821 A1* | 10/2016 | Cho | G06T 3/4038 |
| 2016/0353089 A1* | 12/2016 | Gallup | G02B 27/0172 |
| 2017/0046820 A1 | 2/2017 | Steel et al. | |
| 2017/0078653 A1* | 3/2017 | Bi | G06T 3/0062 |
| 2017/0094169 A1* | 3/2017 | Yoshikawa | H04N 5/2254 |
| 2018/0160106 A1* | 6/2018 | Esteban | G02B 27/0172 |

OTHER PUBLICATIONS

Farid et al, A panoramic 3D video coding with directional depth aided inpainting (Year: 2014).*

Huang et al, Stereo panoram imaging and display for 3D VR system (Year: 2008).*

Extended European Search Report issued in counterpart European Patent Application No. 18181758.6 dated Nov. 15, 2018.

Zhe Zhu et al. "A Comparative Study of Blending Algorithms for Realtime Panoramic Video Stitching", Tsinghua University and Cardiff University, Jun. 2, 2016, pp. 1-14.

Jia Liu et al. "Mosaicing of Fisheye Images Through Conformal Projection and Sphere Matching", College of Information Systems and Management, National University of Defense Technology, Deya Road, Changsha 410000, China, Proc. of SPIE, vol. 10225, pp. 102250T-1-7.

* cited by examiner

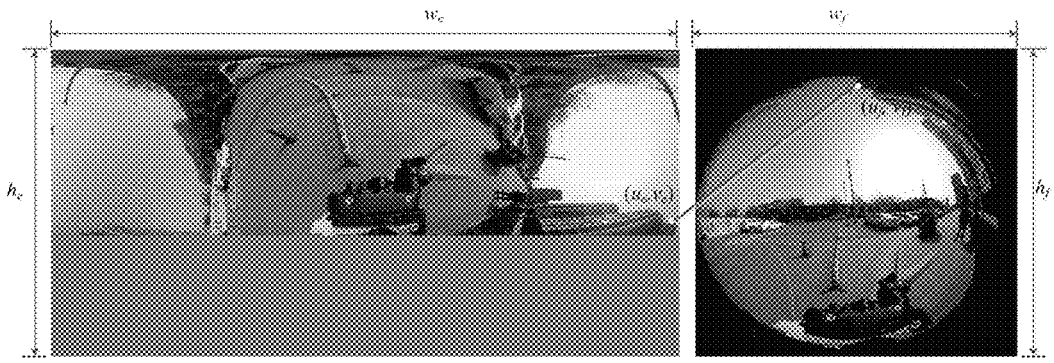
First Equirectangular Image  
FIG. 6B
First Fisheye Image  
FIG. 6C
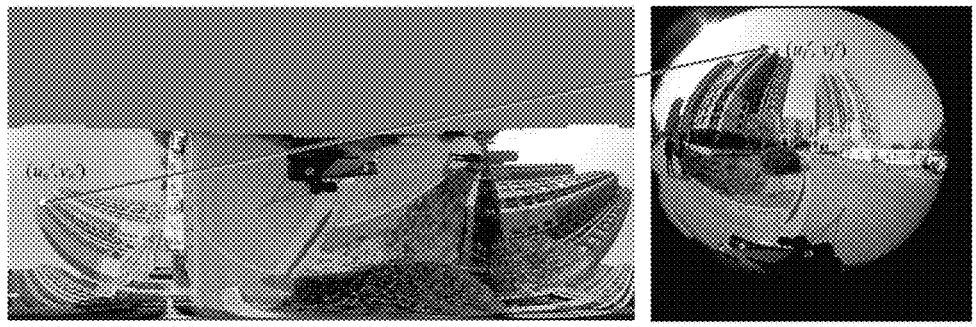
Second Equirectangular Image  
FIG. 6D
Second Fisheye Image  
FIG. 6E

METHOD AND DEVICE FOR GENERATING A PANORAMIC IMAGE

CROSS REFERENCE TO RELATED APPLICATION

The application is based upon and claims priority to Chinese Patent Application No. 201710538676.X, filed Jul. 4, 2017, the entire contents of which are incorporated herein by reference.

TECHNICAL FIELD

The present application relates to an imaging device, and more specifically to devices and methods for generating a panoramic image.

BACKGROUND

In many industrial, commercial, and scientific applications, a 360-degree panoramic imaging device is an important device for creating virtual reality content. Generally, the panoramic imaging device may include a plurality of cameras (e.g., wide-angle cameras) to capture images of scenes within 360 degrees. The images of scenes may be further combined into a panoramic image. A number of cameras for the panoramic imaging device depends on how wide-angled the cameras are.

A fisheye camera is a camera intended to create a wide panoramic or hemispherical image, but can produce strong distortion. Fisheye cameras are generally considered to be cameras having field of view (FOV) of at least 180 degrees. That is, not only the view above the horizontal plane where the fisheye camera is disposed is captured, but also the view below the horizontal plane. Therefore, a panoramic imaging device may only need two fisheye cameras to cover a 360-degree panoramic view.

For example, a panoramic imaging device may be used to capture exemplary fisheye images shown in FIG. 1A and FIG. 1B. These images are planar representations of a portion of a sphere. The panoramic imaging device capturing FIG. 1A and FIG. 1B may include a first fisheye camera and a second fisheye camera disposed on a camera rig. As shown in FIG. 1A, the first fisheye camera captures a front hemispherical image for a view in front of the rig. And, as shown in FIG. 1B, the second fisheye camera captures a rear hemispherical image for the view behind the rig. Then, the first and second hemispherical images may be combined, or "stitched," into a panoramic image. However, directly stitching two hemispherical images (i.e., fisheye images) may be complex and time-consuming.

The methods and devices of this disclosure address the above problem by reducing the complexity of combining two fisheye images into a panoramic image.

SUMMARY

Consistent with some embodiments of the present disclosure, a method for generating a panoramic image is provided, including: capturing first and second fisheye images in a first coordinate system by an imaging device; performing a coordinate system rotation process on the first coordinate system to obtain a second coordinate system; performing an equirectangular projection process on the first and second fisheye images to respectively obtain first and second equirectangular images in the second coordinate system; performing a blending process on the first and second equirectangular images to form a blended image; and performing an orientation correction process on the blended image to obtain the panoramic image.

Consistent with some embodiments of the present disclosure, a device for generating a panoramic image is provided, including: an imaging device configured to capture first and second fisheye images in a first coordinate system; a memory, configured to store the first and second fisheye images, and instructions; and a processor, configured to execute the instructions to perform: a coordinate system rotation process on the first coordinate system to obtain a second coordinate system; an equirectangular projection process on the first and second fisheye images to obtain first and second equirectangular images in the second coordinate system, respectively; a blending process on the first and second equirectangular images to form a blended image; and an orientation correction process on the blended image to obtain the panoramic image.

It is to be understood that both the foregoing general description and the following detailed description are exemplary and explanatory only and are not restrictive of the invention, as claimed.

BRIEF DESCRIPTION OF THE DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6B and FIG. 6C are schematic diagrams for positional relations between an equirectangular image and a fisheye image, according to embodiments of the disclosure;

FIG. 6D and FIG. 6E are schematic diagrams for positional relations between another equirectangular image and another fisheye image, according to embodiments of the disclosure;

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention.

In one embodiment of the disclosure, a panoramic imaging device is provided for generating a panoramic image.

Figure 1A:
FIG. 1A and FIG. 1B illustrate two exemplary images captured by a panoramic imaging device, according to embodiments of the disclosure.
Figure 1B:
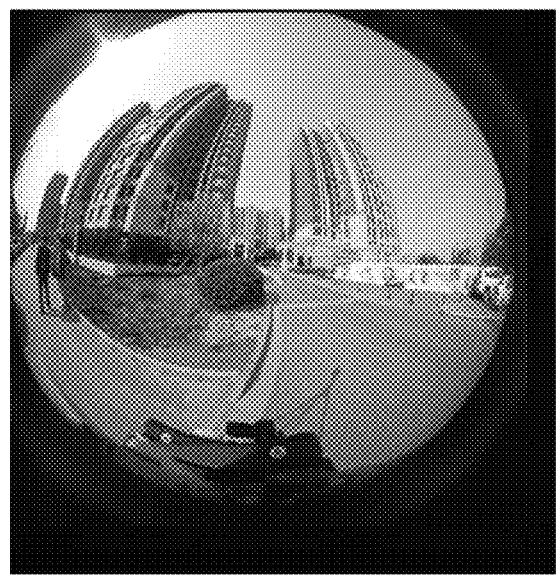
Figure 2:
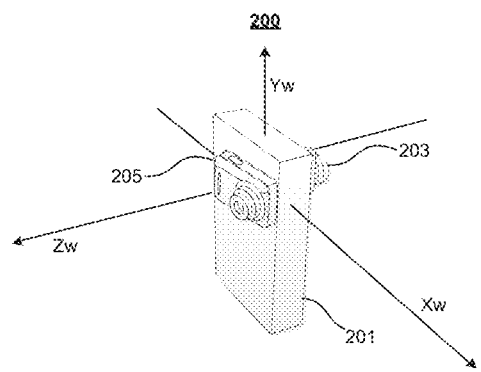
FIG. 2 is a schematic diagram of an exemplary panoramic imaging device, according to embodiments of the disclosure.

FIG. 2 is a schematic diagram of an exemplary panoramic imaging device 200 capturing images of FIG. 1A and FIG. 1B. Panoramic imaging device 200 may include a mounting frame, or rig 201; a first fisheye camera 203; and a second fisheye camera 205.

As shown in FIG. 2, panoramic imaging device 200 is located on an origin of a first world coordinate system. A world coordinate system (WCS) is a universal coordinate system. Coordinates in any other coordinate system may be transformed into coordinates in the WCS, and vice versa.

In FIG. 2, it is assumed that first fisheye camera 203 of panoramic imaging device 200 is a front-facing camera for capturing views in front of panoramic imaging device 200 and second fisheye camera 205 is a rear-facing camera for capturing view behind panoramic imaging device 200.

In this case, a Zw axis of the first world coordinate system points at a rear direction of panoramic imaging device 200. That is, first fisheye camera 203 faces (i.e., has a field of view) toward a negative direction of the Zw axis and second fisheye camera 205 faces toward a positive direction of the Zw axis. And, an Xw axis is pointing at a right direction of panoramic imaging device 200. The Zw axis and the Xw axis may define a vertically oriented plane where panoramic imaging device 200 is located. A Yw axis is then perpendicular to the plane and points upward. Therefore, each pixel that is captured by panoramic imaging device 200 may be positionally defined as $(x_w, y_w, z_w)$.

Each of fisheye cameras 203 and 205 may include an image sensor (not shown). The image sensor may be a Complementary Metal Oxide Semiconductor (CMOS) sensor, a Charge-Coupled Device (CCD) sensor, or any type of image sensor capable of capturing incident photons and reading pixel data.

Figure 3:
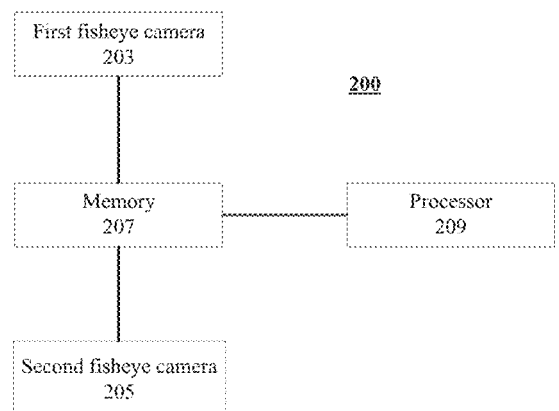
FIG. 3 is a block diagram of the exemplary panoramic imaging device, according to embodiments of the disclosure.

FIG. 3 is a block diagram of panoramic imaging device 200. Panoramic imaging device 200 may include a non-transient computer-readable medium, such as a memory 207, configured to store the instructions, data, and images captured for further processing. Memory 207 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Panoramic imaging device 200 includes a processor 209 to execute software instructions (program code), and performs functions in accordance with techniques described herein. Software instructions include routines, programs, objects, components, data structures, procedures, modules, and functions, which perform particular functions described herein.

As discussed above, fisheye cameras have a wide field of view (FOV). The FOVs for first and second fisheye cameras 203 and 205 may each be more than 180 degrees. That is, first and second fisheye cameras 203 and 205 may even capture views behind themselves. In one embodiment, FOVs for first fisheye camera 203 and second fisheye camera 205 may be 190 degrees. It should be noted that the FOV for first fisheye camera 203 and the FOV for second fisheye camera 205 can be different.

Figure 4:
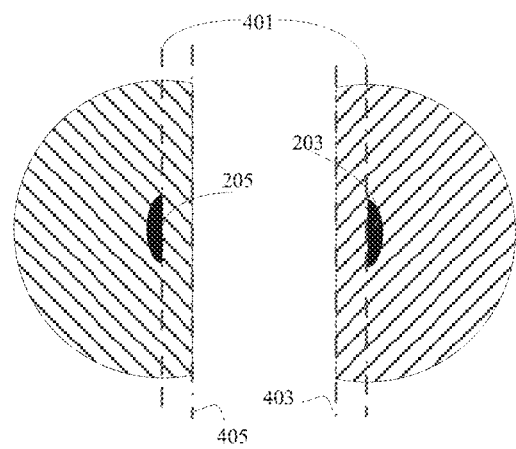
FIG. 4 is a schematic diagram of fields of view for a first fisheye camera and a second fisheye camera, according to embodiments of the disclosure.

FIG. 4 is a schematic diagram of the fields of view for first fisheye camera 203 and second fisheye camera 205, according to embodiments of the disclosure, viewed from the top as seen in FIG. 2, that is, in the −Yw direction. As shown in FIG. 4, shadowed areas indicate the fields of view. A rig plane 401 is a vertically oriented centerline plane of rig 201, defined by axes Yw and Xw of FIG. 2. As rig 201 may have a thickness, first fisheye camera 203 and second fisheye camera 205 may not be exactly attached to a same plane and FIG. 4 is merely an exemplary illustration.

As discussed above, first fisheye camera 203 and second fisheye camera 205 have FOVs wider than 180 degrees. Therefore, first fisheye camera 203 may capture a first fisheye image in front of (i.e., to the right of) a first plane 403 that is behind rig plane 401. That is, first fisheye camera 203 may be able to capture subjects behind itself. Similarly, second fisheye camera 205 may capture a second fisheye image behind a second plane 405 that is in front of rig plane 401. That is, second fisheye camera 205 may be able to capture subjects behind itself as well.

In further processes, the first and second fisheye images may be subject to a coordinate system rotation process, an equirectangular projection process, a blending process, and an orientation correction process, so as to generate a low-distortion panoramic image for a 360 degree view around the entire horizon of panoramic imaging device 200. These processes may be further described as below.

In the coordinate system rotation process, the coordinate system of panoramic imaging device 200 as shown in FIG. 2 may be rotated, so as to generate a second world coordinate system. In some embodiments, equirectangular images in the second world coordinate system are rectangular-shaped. The rectangular equirectangular images may facilitate the blending process and improve efficiency.

The coordinate system rotation process will be discussed in detail as below.

In some embodiments, the coordinate system rotation process may rotate the first world coordinate system of FIG. 2 around the Xw axis by −90° to obtain a second world coordinate system. It should be noted that, because the world coordinate system (WCS) may be converted to any other coordinate system, the coordinate system rotation process may also applied on other coordinate systems by converting these coordinate systems into world coordinate systems first.

Figure 5:
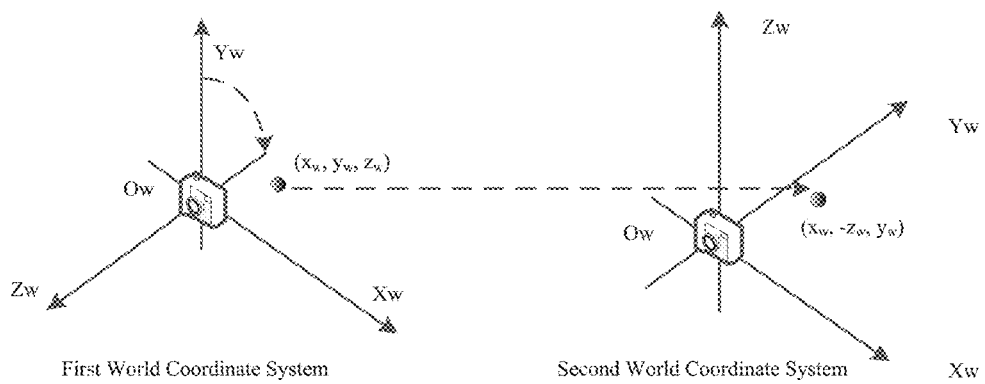
FIG. 5 is an schematic diagram for a coordinate system rotation process, according to embodiments of the disclosure.

FIG. 5 is a schematic diagram for a coordinate system rotation process, according to embodiments of the disclosure.

In FIG. 5, the Xw axis is kept as it is. That is, the Xw is still pointing at the same direction, as shown in FIG. 5. And the Yw axis and the Zw axis are rotated around the Xw axis by −90°, as indicated by the arrow in FIG. 5. That is, coordinates ($x_w$, $y_w$, $z_w$) for a pixel in the first world coordinate system will be changed to coordinates ($x_w$, $-z_w$, $y_w$) for a corresponding pixel in the rotated world coordinate system (i.e., the second world coordinate system). It should be noted that in this embodiment, during the coordinate system rotation process, only the coordinate system is rotated, and panoramic imaging device 200 is not rotated along with the coordinate system.

As discussed above, the Yw axis in the positive direction in the first world coordinate system is pointing vertically up. Therefore, after all pixels of fisheye images have been subject to the coordinate system rotation process, the pixels of the fisheye images are in a coordinate system as if they were captured by a fisheye camera facing up and another fisheye camera facing down when the Yw axis in the second world coordinate system is also an axis pointing vertically up.

In the equirectangular projection process, each pixel of a fisheye image is projected to an equirectangular image (to be described below) by an equirectangular mapping table. The equirectangular mapping table includes positional relations between pixels of the fisheye image and pixels of equirectangular image. In one embodiment, the equirectangular mapping table is determined in advance, so that the equirectangular projection process may be performed efficiently.

In order to obtain the positional relations stored in the equirectangular mapping table, positions for each pixel in different coordinate systems should be calculated. In some embodiments, the coordinate systems may include an image coordinate system, a spherical coordinate system, a world coordinate system, and a camera coordinate system.

It should be noted that the equirectangular image mentioned in the equirectangular projection process is defined in the second world coordinate system (i.e., the rotated world coordinate system), and that is the reason why the equirectangular image according to some embodiments of the disclosure is rectangular-shaped.

Figure 6A:
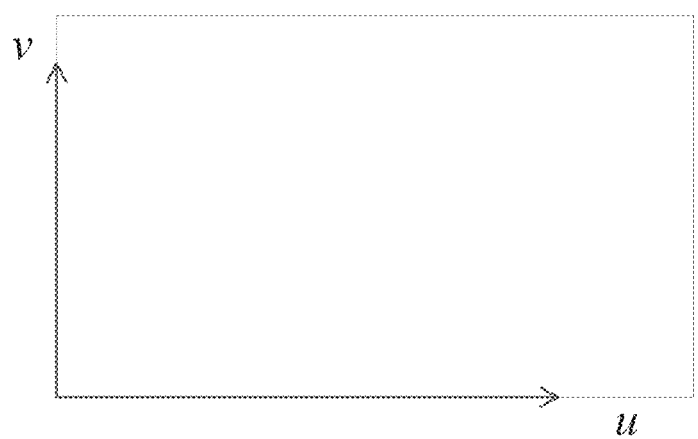
FIG. 6A is a schematic diagrams for an image coordinate system, according to embodiments of the disclosure.

FIG. 6A is a schematic diagram showing a rectilinear image coordinate system for pixels in a planar image. The rectilinear image coordinate system of FIG. 6A is a two-dimensional coordinate system, including a horizontal axis u and a vertical axis v. It should be noted that each planar image has its own image coordinate system and each pixel in the planar image has its coordinates expressed in the rectilinear image coordinate system.

FIG. 6B and FIG. 6C are a first equirectangular image and a corresponding first fisheye image according to some embodiments of the disclosure, and FIG. 6D and FIG. 6E are a second equirectangular image and a corresponding second fisheye image according to some embodiments of the disclosure.

As shown in FIG. 6B and FIG. 6C, a position for a pixel in the first equirectangular image is indicated by ($u_e$,$v_e$), and a position for the same pixel in the first fisheye image is indicated by ($u_f$, $v_f$). Furthermore, a width of the first equirectangular image is $w_e$, a height of the first equirectangular image is $h_e$, a width of the first fisheye image is $w_f$, and a height of the first fisheye image is $h_f$. As it can be seen from FIG. 6B and FIG. 6C, vertical buildings in the first fisheye image is stretched to be horizontal in the equirectangular image because the vertical axis Yw is rotated by −90° around the Xw axis.

This "stretching" (i.e., the correspondence relations between ($u_e$,$v_e$) and ($u_f$,$v_f$) for each of the pixels) is expressed in an equirectangular mapping table. In particular, the positional relations between each pixel in the first equirectangular image and a corresponding pixel in the first fisheye image constitute the elements of the equirectangular mapping table. Similarly, the positional relations between each pixel in the second equirectangular image and a corresponding pixel in the second fisheye image also constitute the elements of the equirectangular mapping table.

A process for determining these positional relations between the equirectangular image and the fisheye image to construct the equirectangular mapping table will now be described.

The pixel at ($u_e$,$v_e$) of the first equirectangular image in the second world coordinate system will first be converted to a spherical coordinate system. The second world coordinate system may be further converted to a camera coordinate system, and then be converted to an image coordinate system for a fisheye image. By means of these transitions among coordinate systems, the positional relation between a pixel at ($u_f$, $v_f$) in the first fisheye image and a pixel at ($u_e$,$v_e$) in the first equirectangular image may be determined. Similarly, positional relation between a pixel at ($u_f'$, $v_f'$) in the second fisheye image a pixel at ($u_e'$,$v_e'$) in the second equirectangular image may also be determined.

Figure 7:
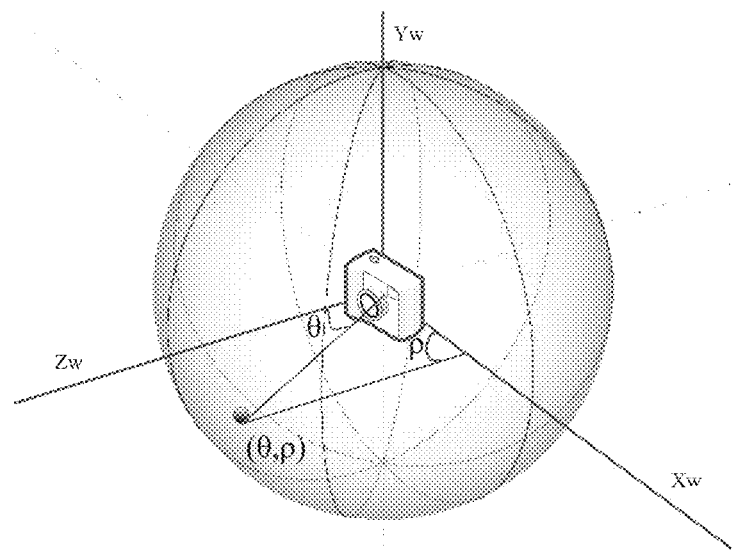
FIG. 7 is a schematic diagram of a spherical coordinate system, according to embodiments of the disclosure.

FIG. 7 is a schematic diagram of a spherical coordinate system according to embodiments of the disclosure. Coordinates (r,θ,ρ) in a spherical coordinate system may be determined for the pixel at ($u_e$,$v_e$) in the first equirectangular image.

As shown in FIG. 7, the radial distance is r, azimuthal angle is θ, and polar angle is ρ. Assuming a constant value of r of one unit, a position of a pixel in the fisheye image may be defined as (θ,ρ), when the camera is located at the origin of the spherical coordinate system.

In one embodiment, ($u_e$,$v_e$) in the equirectangular image may be projected to (θ,ρ) in a spherical coordinate system by equations below.

$$\theta = \frac{\pi}{2} - \frac{\pi u_e}{h_e} \qquad \text{Equation 1.1}$$

$$\rho = \frac{2\pi v_e}{w_e} \qquad \text{Equation 1.2}$$

Because coordinates in any other coordinate system may be transformed into coordinates in the WCS, (θ,ρ) in the spherical coordinate system will be further transformed to world coordinates ($x_w$, $y_w$, $z_w$) in the world coordinate system by equations below.

$$x_w = -\cos(\theta)\sin(\rho) \qquad \text{Equation 2.1}$$

$$y_w = \sin(\theta) \qquad \text{Equation 2.2}$$

$$z_w = \cos(\theta)\cos(\rho) \qquad \text{Equation 2.3}$$

Figure 8:
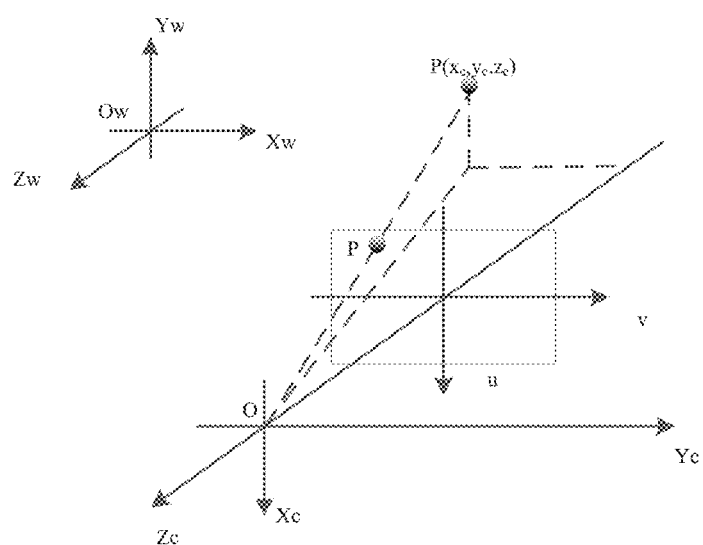
FIG. 8 is a schematic diagram of a camera coordinate system, according to embodiments of the disclosure.

FIG. 8 is a schematic diagram of a camera coordinate system according to embodiments of the disclosure.

A camera coordinate system (CCS) is another three-axis coordinate system that has an origin located at the optical center of a camera. In the CCS, the Xc axis and the Yc axis are respectively parallel to x axis and y axis of the image plane, and Zc axis is the optical axis of the camera.

Coordinates $(x_w, y_w, z_w)$ in the world coordinate system will be further transformed to camera coordinates $(x_c, y_c, z_c)$ in the camera coordinate system by an equation as below.

$$[x_c, y_c, z_c]^T = R[x_w, y_w, z_w]^T + T \qquad \text{Equation 3.1}$$

In the above Equation 3.1, R is a 3×3 rotation matrix between the camera coordinate system and the world coordinate system. And T is a 3×1 translation vector of the two coordinate systems. In other words, R and T describe the relative positional relation between the camera coordinate system and the world coordinate system. Both R and T are extrinsic parameters unique to each camera.

For example, with respect to FIG. 2, the origin of a world coordinate system is a middle point between first fisheye camera 203 and second fisheye camera 205. And R and T may reflect the above exemplary positional relation between the world coordinate system and the camera coordinate system of first fisheye camera 203, for instance.

Generally, the coordinates $(x_c, y_c, z_c)$ in the camera coordinate system represent how the camera sees the pixel. However, the FOV of the fisheye camera is so wide that radial distortion happens. Radial distortion is most visible when taking pictures of vertical structures having straight lines which then appear curved, as it can be seen from FIG. 6B and FIG. 6C. Thus, the coordinates $(x_c, y_c, z_c)$ in the camera coordinate system still need further processing to reduce radial distortion and locate the pixel in the fisheye image that corresponds to the pixel in the equirectangular image. Any suitable radial distortion method may be adopted to transform the coordinates $(x_c, y_c, z_c)$ in the camera coordinate system to obtain the coordinates $(u_f, v_f)$ in the fisheye image.

Therefore, the positional relation between a pixel of the fisheye image and a corresponding pixel of the equirectangular image may be generated according to the above Equations 1.1, 1.2, 2.1-2.3, and 3.1, and the radial distortion method. Generally, positional relations between all pixels of the equirectangular image and all corresponding pixels of the fisheye image may be generated in advance. The positional relations may be stored to form an equirectangular mapping table.

A pixel at $(u_e', v_e')$ in the second equirectangular image and a pixel at $(u_f', v_f')$ in the second fisheye image, as shown in FIG. 6D and FIG. 6E, may also have positional relations similarly generated and stored in the equirectangular mapping table, description of which will be omitted herein for clarity.

Given coordinates of a pixel in the fisheye image, corresponding coordinates in the equirectangular image may be obtained by looking up in the equirectangular mapping table. Then, values of pixels in the fisheye image may be provided to pixels at the corresponding coordinates in the equirectangular image, so as to generate the equirectangular image. Because the equirectangular image generated according to the equirectangular mapping table is in a shape of rectangle, the blending process performed on the equirectangular image will be simplified and provide better effects.

Figure 9A:
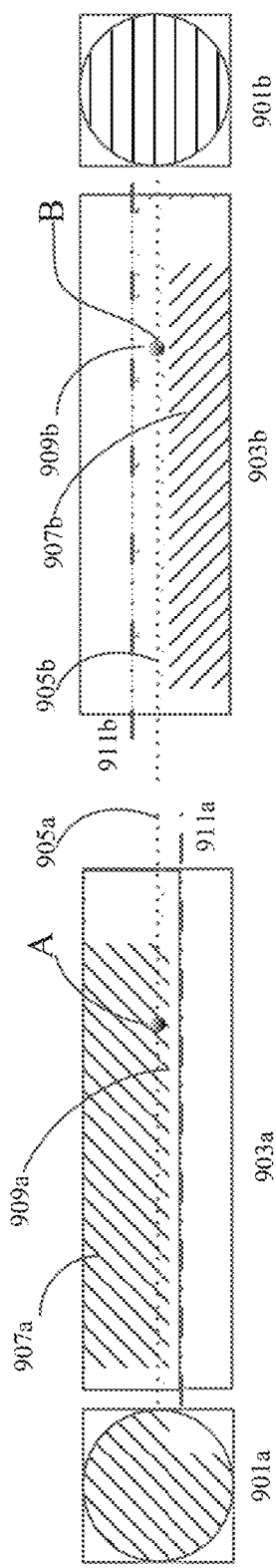
FIG. 9A is a schematic diagram of showing a relationship between fisheye images and equirectangular images, according to embodiments of the disclosure.

FIG. 9A is a schematic diagram showing relationships between fisheye images and equirectangular images according to embodiments of the disclosure. As shown in FIG. 9A, a equirectangular projection process may be performed on first and second fisheye images 901a and 901b, so as to obtain first and second equirectangular images 903a and 903b, respectively.

As discussed with reference back to FIG. 5, after all pixels of fisheye images have been subject to the coordinate system rotation process, the pixels of the fisheye images are in a coordinate system as if they were captured by a "virtual" fisheye camera facing up and another "virtual" fisheye camera facing down when the Yw axis in the second world coordinate system is also an axis pointing vertically up.

Thus, in FIG. 9A, horizontal planes 905a and 905b indicate the horizontal planes where the facing-up virtual fisheye camera and the facing-down virtual fisheye camera are disposed, respectively.

Because fisheye cameras generally have FOVs that are wider than 180 degrees, first and second equirectangular images 903a and 903b may include pixels beyond horizontal planes 905a and 905b. For example, first equirectangular image 903a may include area 909a above horizontal plane 911a that is below horizontal plane 905a. Similarly, second equirectangular image 903b may include area 909b below horizontal plane 911b that is above horizontal plane 905b. That is, when horizontal planes 905a and 905b overlap, the facing-up fisheye camera and the facing-down fisheye camera share some views in common.

In FIG. 9A, area 907a indicates an area above horizontal plane 905a in first equirectangular image 903a, and area 907b indicates an area below horizontal plane 905b in second equirectangular image 903b.

And, an overlapped area between horizontal plane 911a and horizontal plane 911b corresponds to views that the facing-up virtual fisheye camera and the facing-down virtual fisheye camera share in common. In further processes, the overlapped area between horizontal plane 911a and horizontal plane 911b will be identified and blended.

It should be noted that, areas 909a between horizontal planes 905a and 911a and area 909b between horizontal planes 905b and 911b are related to the amount by which the FOVs of first and second fisheye cameras 203 and 205 exceed 180 degrees. Generally, if areas 909a and 909b are wider, the blending process discussed below may provide better effects on blending.

A blending process may be performed on first and second equirectangular images 901b and 903b by panoramic imaging device 200, so as to stitch two images into one, thus forming a single blended image. The blended image may then be further processed to generate a panoramic image.

In one embodiment, feature points in the first and second equirectangular images corresponding to the same item in the actual scene captured by panoramic imaging device 200 may be located in first and second equirectangular images 903a and 903b, respectively. For example, in FIG. 9A, point A in first equirectangular image 903a and point B in second equirectangular image 903b are feature points corresponding to the same item. The blending process may identify other feature points corresponding to the same items, and align the first and second equirectangular images according to these feature points, so as to form a single blended image.

Figure 9B:
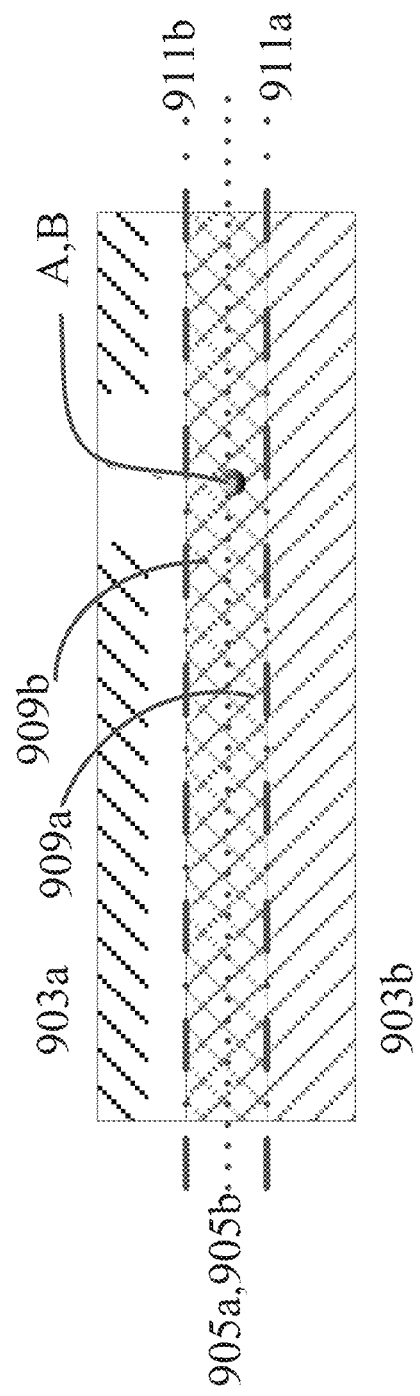
FIG. 9B is a schematic diagram of overlapped equirectangular images, according to embodiments of the disclosure.

FIG. 9B is a schematic diagram of a blended image according to embodiments of the disclosure. In FIG. 9B, the overlapped area between horizontal plane 911a and horizontal plane 911b is formed by aligning, for example, feature points A and B. With reference to FIG. 9A and FIG. 9B, area 909a in image 903a overlaps with a portion of area 907b in image 903b. Similarly, area 909b in image 903b overlaps with a portion of area 907a in image 903a. Therefore, pixel values of pixels in the overlapped area cannot be simply added up.

Thus, the blending process may further include a pyramid blending method to be performed on first equirectangular image 901*b* and second equirectangular image 903*b*, for example. The pyramid blending method may build Laplacian pyramids LA and LB from equirectangular images 903*a* and 903*b*, build a Gaussian pyramid GM further from a mask M (e.g., a matrix of 5×5), and generate a blended image based on the Laplacian pyramids and the Gaussian pyramid.

The Gaussian pyramid may include several images consisting of an image pyramid. The original image may be considered as the lowest layer (Layer 0) of the image pyramid. A convolution may be performed on the original image based on the mask M to generate a convoluted image. Then, the convoluted image may be sampled, for example, by removing odd lines and odd columns, so that Layer 1 above the original image is generated.

Then, Layer 1 may be used as an input for the above process, to obtain a higher layer. These layers may constitute the Gaussian pyramid.

During the calculation of the Gaussian pyramid, the convolution and sampling may discard a considerable amount of high frequency information. In order to describe the high frequency information that is lost during the calculation of the Gaussian pyramid, the Laplacian pyramid may be generated.

After the Laplacian pyramid has been generated, the blending process may be performed based on the Gaussian pyramid and the Laplacian pyramid. Because equirectangular images 903*a* and 903*b* are both regular-shaped rectangles, an algorithm of the blending process may be simplified. The overlapped area in the blended image may be more smooth, and color distortion may be fixed as well.

Figure 10:
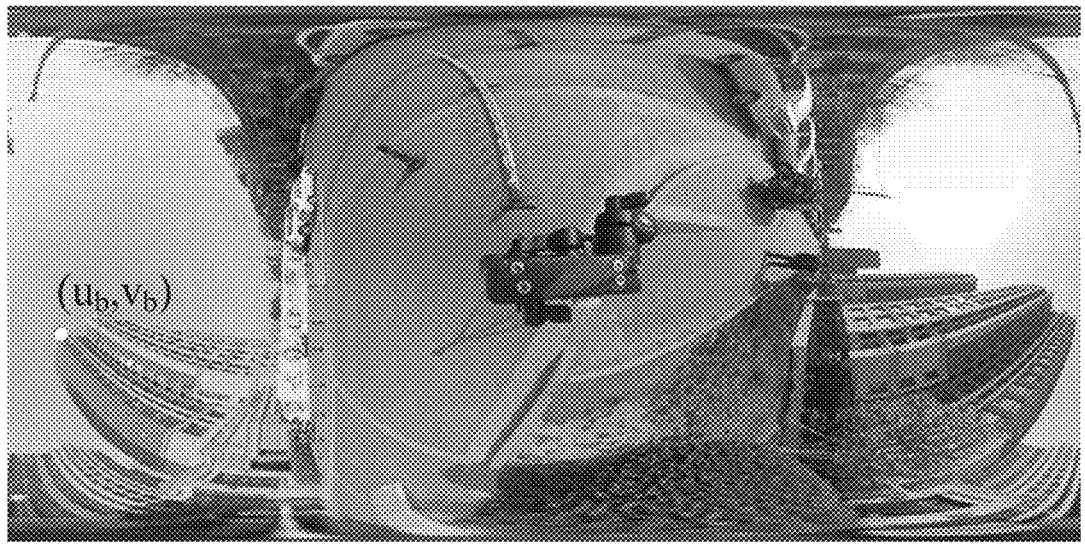
FIG. 10 is an exemplary blended image generated by performing a blending process on two equirectangular images, according to embodiments of the disclosure.

FIG. 10 is an exemplary blended image generated by a blending process, according to embodiments of the disclosure. As it can be seen from FIG. 10, orientational distortions are very obvious in the blended image. Therefore, panoramic imaging device 200 may perform an orientation correction process on the blended image to obtain the panoramic image.

As discussed above, a coordinate system rotation process has been performed on the first world coordinate system, to generate the second world coordinate system. And the equirectangular image is a rectangular image because it is in the second world coordinate system. However, the second world coordinate system also introduces orientation distortions.

Similarly to the equirectangular mapping table, an orientation mapping table also may be generated for the orientation correction process. The orientation mapping table may be pre-determined and built in to the cameras, or generated when it is necessary.

In one embodiment, a position for a pixel of the blended image in the second world coordinate system is indicated as $(u_b, v_b)$, and a position for a pixel of the panoramic image in the first world coordinate system is indicated as $(u_p, v_p)$. The orientation mapping table may include positional relations between the pixel $(u_b, v_b)$ in the second world coordinate system and the pixel $(u_p, v_p)$ in the first world coordinate system for each pair of pixels.

Figure 11:
FIG. 11 is an exemplary panoramic image generated by performing an orientation correction process on a blended image, according to embodiments of the disclosure.

By performing the orientation correction process on the blended image, a panoramic image may be generated. FIG. 11 is an exemplary panoramic image generated by performing an orientation correction process on a blended image of FIG. 10, according to embodiments of the disclosure.

Above-disclosed panoramic imaging device 200 may generate a panoramic image by capturing a first fisheye image for views in front of device 200 and a second fisheye image for views behind device 200 in a first world coordinate system, rotating the first world coordinate system to obtain a second world coordinate system, generate a blended image by blending two rectangular equirectangular images in the second world coordinate system generated by the first fisheye image and the second fisheye image, and correcting orientation in a blended image to generate a panoramic image in the first world coordinate system. Because the two equirectangular images in the second coordinate are regular-shaped, blending them may be simplified. Therefore, panoramic imaging device 200 may be able to generate the panoramic image with less time and better quality.

Figure 12:
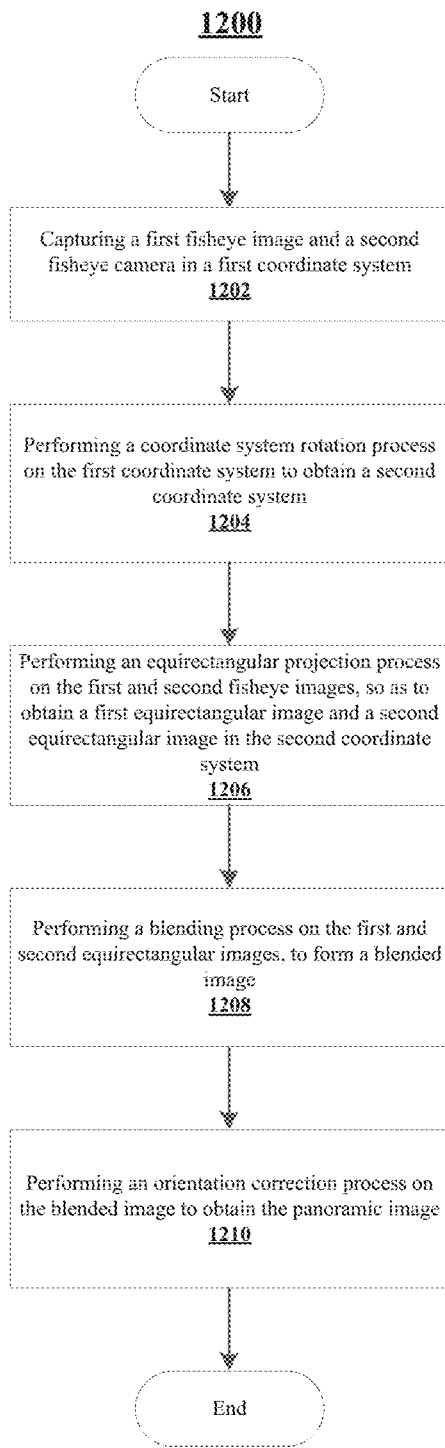
FIG. 12 is a flow chart of a method for generating a panoramic image, according to embodiments of the disclosure.

FIG. 12 is a flowchart of a method 1200 for generating a panoramic image according to embodiments of the disclosure. For example, method 1200 may be performed by panoramic imaging device 200, and may include steps 1202-1210 discussed as below.

In step 1202, panoramic imaging device 200 may capture first and second fisheye images in a first coordinate system by an imaging device, respectively. The imaging device may include first and second fisheye cameras. FOVs of the first and second fisheye cameras may each be greater than 180 degrees. For example, FOVs of the first and second fisheye cameras may be both 190 degrees. It should be noted that, the FOVs of the two fisheye cameras need not be the same, as long as both FOVs are greater than 180 degrees.

As discussed above, panoramic imaging device 200 may comprise a camera system having first and second fisheye cameras to capture the first and second fisheye images. However, the above step 1102 may be performed by an imaging system with only one fisheye camera. For example, the fisheye camera may capture the first fisheye image and then may be rotated by 180 degrees by the imaging system to capture the second fisheye image. Therefore, the first fisheye camera and the second fisheye camera may refer to a single fisheye camera disposed at different positions.

In step 1204, panoramic imaging device 200 may perform a coordinate system rotation process on the first coordinate system to obtain a second coordinate system.

The first coordinate system may include an origin where the imaging device is located; a Zw axis that points in a rear direction of the imaging device; an Xw axis that points in a right direction of the imaging device, the Zw axis and the Xw axis forming a plane where the imaging device is located; and a Yw axis that is perpendicular to the plane and points upward. The coordinate system rotation process may rotate the first coordinate system around the Xw axis by −90°.

In step 1206, panoramic imaging device 200 may perform an equirectangular projection process on the first and second fisheye images, so as to obtain first and second equirectangular images in the second coordinate system, respectively. For example, in the equirectangular projection process, a fisheye image may be projected to an equirectangular image by a first mapping table. The first mapping table may include a positional relation between a pixel in the fisheye image and a corresponding pixel in the equirectangular image. And the equirectangular projection process may further include steps of receiving coordinates of the pixel in the fisheye image; looking up the coordinates in the first mapping table; obtaining corresponding coordinates of the pixel in the equirectangular image; and supplying values of pixels in the fisheye image as values of corresponding pixels of the equirectangular image. A radial distortion method may be also performed in step 1206.

After the equirectangular projection process has been performed on each pixel of the fisheye image, the equirectangular image in the second coordinate system is generated.

In step 1208, panoramic imaging device 200 may perform a blending process on the first and second equirectangular images, to form a blended image. For example, the blending process may further include identifying feature points for the first and second equirectangular images; aligning the first and second equirectangular images according to the feature points; and performing a pyramid blending method on the first and second equirectangular images to generate the blended image.

In step 1210, panoramic imaging device 200 may perform an orientation correction process on the blended image to obtain the panoramic image. For example, the orientation correction process may include projecting pixels of the blended image to the panoramic image by a second mapping table. The second mapping table may include positional relations between the pixels of the blended image and pixels of the panoramic image. That is, the second mapping table may include positional relations between the pixels in the first coordinate system and corresponding pixels in the second coordinate system.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks may be substantially executed in parallel, and sometimes, they may also be executed in the reverse order, depending on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more computer-readable storage media (including but not limited to a magnetic disk memory, a CD-ROM, an optical memory, etc.) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, may be implemented by computer program instructions. These computer program instructions may be provided to a processor of a computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that may direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage may be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising", "having", "containing", and "including", and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an", and "the" include plural references unless the context clearly dictates otherwise.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A method for generating a panoramic image, comprising:
    capturing first and second fisheye images in a first coordinate system by an imaging device, the first coordinate system comprising:
        an origin where the imaging device is located;
        a Z-axis that points in a first direction toward a rear of the imaging device;
        an X-axis that points in a second direction with respect to the imaging device, the Z-axis and the X-axis forming a plane where the imaging device is located; and
        a Y-axis that is perpendicular to the plane and points in a third direction with respect to the imaging device;
    performing, by at least one processor, a coordinate system rotation process on the first coordinate system, the coordinate system rotation process comprising rotating the first coordinate system around the X-axis by −90°, to generate a second coordinate system;
    performing, by the at least one processor, an equirectangular projection process on the first and second fisheye images to respectively obtain first and second equirectangular images in the second coordinate system;
    performing, by the at least one processor, a blending process on the first and second equirectangular images to form a blended image; and
    performing an orientation correction process on the blended image to obtain the panoramic image.

2. The method of claim 1, wherein capturing the first and second fisheye images comprises capturing the first and second fisheye images by first and second fisheye cameras of the imaging device, respectively; the first fisheye camera facing toward a negative direction of the Z-axis, and the second fisheye camera facing toward a positive direction of the Z-axis.

3. The method of claim 2, wherein fields of view of the first and second fisheye cameras are greater than 180 degrees.

4. The method of claim 3, wherein fields of view of the first and second fisheye cameras are 190 degrees.

5. The method of claim 1, wherein the equirectangular projection process comprises projecting a fisheye image to an equirectangular image by a first mapping table.

6. The method of claim 5, wherein the first mapping table comprises positional relations between pixels in the fisheye image and corresponding pixels in the corresponding equirectangular image.

7. The method of claim 6, wherein the equirectangular projection process further comprises:
    receiving coordinates of pixels in the fisheye images;
    looking up the received coordinates in the first mapping table;
    obtaining from the first mapping table corresponding coordinates of pixels in the corresponding equirectangular images; and
    supplying values of pixels in the fisheye images to pixels in the corresponding coordinates of the equirectangular image.

8. The method of claim 1, wherein the blending process comprises:
    identifying feature points in the first equirectangular image which correspond to feature points in the second equirectangular image;
    aligning the first and second equirectangular images according to the identified feature points; and
    performing a pyramid blending method on the first and equirectangular images to generate the blended image.

9. The method of claim 1, wherein the orientation correction process comprises projecting pixels of the blended image to the panoramic image according to a second mapping table.

10. The method of claim 9, wherein the second mapping table comprises positional relations between pixels in the first coordinate system and corresponding pixels in the second coordinate system.

11. A device for generating a panoramic image, comprising:
    an imaging device configured to capture first and second fisheye images in a first coordinate system the first coordinate system comprising:
        an origin where the imaging device is located;
        a Z-axis that points in a first direction toward a rear of the imaging device;
        an X-axis that points in a second direction with respect to the imaging device, the Z-axis and the X-axis forming a plane where the imaging device is located; and
        a Y-axis that is perpendicular to the plane and points in a third direction with respect to the imaging device;
    a memory, configured to store the first and second fisheye images, and instructions; and
    at least one processor, configured to execute the instructions to perform:
        a coordinate system rotation process on the first coordinate system, the coordinate system rotation process comprising rotating the first coordinate system around the X-axis by −90°, to generate a second coordinate system;
an equirectangular projection process on the first and second fisheye images to obtain first and second equirectangular images in the second coordinate system, respectively;
a blending process on the first and second equirectangular images to form a blended image; and
an orientation correction process on the blended image to obtain the panoramic image.

12. The device of claim 11, wherein:
the imaging device comprises first and second fisheye cameras to capture the first and second fisheye images, respectively;
the first fisheye camera faces toward a negative direction of the Z-axis; and
the second fisheye camera faces toward a positive direction of the Z-axis.

13. The device of claim 12, wherein fields of view of the first and second fisheye cameras are greater than 180 degrees.

14. The device of claim 13, wherein the fields of view of the first and second fisheye cameras are 190 degrees.

15. The device of claim 11, wherein the equirectangular projection process comprises projecting a fisheye image to an equirectangular image by a first mapping table.

16. The device of claim 15, wherein the first mapping table comprises positional relations between pixels in the fisheye image and corresponding pixels in the equirectangular image.

17. The device of claim 16, wherein the equirectangular projection process further comprises:
receiving coordinates of pixels in the fisheye image;
looking up the received coordinates in the first mapping table;
obtaining corresponding coordinates of pixels in the equirectangular image; and
supplying values of the pixels in the fisheye image to pixels in the corresponding coordinates of the equirectangular image.

18. The device of claim 11, wherein the blending process comprises:
identifying feature points for the first equirectangular image and the second equirectangular image;
aligning the first equirectangular image and the second equirectangular image according to the feature points; and
performing a pyramid blending method on the first equirectangular image and the second equirectangular image to generate the blended image.

19. The device of claim 11, wherein the orientation correction process comprises projecting pixels of the blended image to the panoramic image according to a second mapping table.

20. The device of claim 19, the second mapping table comprises positional relations between pixels in the first coordinate system and corresponding pixels in the second coordinate system.

* * * * *